(12) United States Patent
McBain et al.

(10) Patent No.: US 7,766,648 B2
(45) Date of Patent: Aug. 3, 2010

(54) COATING IN MULTIPLE INJECTION MOLDING PART CAVITIES

(75) Inventors: Douglas McBain, Wadsworth, OH (US); John Thompson, Wooster, OH (US); Elliott Straus, Akron, OH (US)

(73) Assignee: OMNOVA Solutions Inc., Fairlawn, OH (US)

( * ) Notice: Subject to any disclaimer, the term of this patent is extended or adjusted under 35 U.S.C. 154(b) by 1155 days.

(21) Appl. No.: 10/550,435

(22) PCT Filed: Mar. 17, 2004

(86) PCT No.: PCT/US2004/008193

§ 371 (c)(1), (2), (4) Date: Sep. 20, 2005

(87) PCT Pub. No.: WO2004/094127

PCT Pub. Date: Nov. 4, 2004

(65) Prior Publication Data

US 2006/0192321 A1 Aug. 31, 2006

(51) Int. Cl.
*B29C 45/32* (2006.01)
(52) U.S. Cl. .................. 425/588; 425/542; 425/527
(58) Field of Classification Search .......... 425/542, 425/588, 257, 90, 95–98, 104, 520–521, 425/120, 128, 578, 585–587, 591
See application file for complete search history.

(56) References Cited

U.S. PATENT DOCUMENTS

| 4,840,553 | A * | 6/1989 | Arai .................. 425/129.1 |
| 6,558,599 | B1 | 5/2003 | Bethune |
| 6,617,033 | B1 | 9/2003 | Straus et al. |
| 6,676,877 | B2 | 1/2004 | Thompson |
| 6,793,861 | B2 | 9/2004 | McBain et al. |
| 6,875,389 | B2 | 4/2005 | Straus et al. |
| 6,884,056 | B2 | 4/2005 | Thompson |
| 6,887,550 | B2 | 5/2005 | Straus et al. |
| 6,890,469 | B2 | 5/2005 | Straus et al. |
| 2002/0039656 | A1 | 4/2002 | McBain et al. |
| 2002/0171171 | A1 | 11/2002 | Straus et al. |
| 2003/0038407 | A1* | 2/2003 | Bethune ............ 264/478 |
| 2003/0077425 | A1 | 4/2003 | McBain et al. |
| 2003/0077426 | A1 | 4/2003 | Straus |
| 2003/0082344 | A1 | 5/2003 | Straus et al. |

(Continued)

FOREIGN PATENT DOCUMENTS

EP 0 953 419 A2 11/1999

(Continued)

OTHER PUBLICATIONS

International Preliminary Report on Patentability mailed Jun. 30, 2005.

*Primary Examiner*—Kat Wyrozebski
*Assistant Examiner*—Xue Liu
(74) *Attorney, Agent, or Firm*—Fay Sharpe LLP

(57) ABSTRACT

A molding apparatus includes a mold (12,14) defining a plurality of mold cavities (34,36). Fluidly connected to the mold cavities (34,36) are one or more first composition injectors (30) and one or more second composition injectors (32) for delivery of, respectively, the molten material from which the molded article is to be formed and a composition to coat the article so formed.

7 Claims, 5 Drawing Sheets

U.S. PATENT DOCUMENTS

| | | |
|---|---|---|
| 2003/0099809 A1 | 5/2003 | Straus et al. |
| 2003/0190454 A1 | 10/2003 | Thompson |
| 2004/0140586 A1 | 7/2004 | Thompson |
| 2005/0156351 A1 | 7/2005 | Straus et al. |

FOREIGN PATENT DOCUMENTS

| | | | |
|---|---|---|---|
| JP | 04 031019 A | 2/1992 |
| JP | 07 032416 A | 2/1995 |
| JP | 08 309789 A | 11/1996 |
| JP | 09 039024 A | 2/1997 |
| JP | 2002 240087 A | 8/2002 |

* cited by examiner

COATING IN MULTIPLE INJECTION MOLDING PART CAVITIES

BACKGROUND OF THE INVENTION

The present invention relates to coating in multiple injection molding part cavities and controlling the flow of an in-mold coating (IMC) composition that is injected into multiple injection molding part cavities, more particularly to a method of (1) injection molding multiple articles in multiple injection molding part cavities and coating the multiple articles with an IMC composition, (2) using only a single injector to coat the multiple molded articles and/or (3) controlling the flow of the injected IMC composition on the multiple molded articles such that the multiple articles are only coated on desired surfaces or portions thereof. The present invention finds particular application as an apparatus and method for injection molding two articles within two-part cavities defined by mold halves of a single injection molding machine, coating the two articles with an IMC composition using a single IMC composition injector and controlling the flow of the injected IMC composition on the two articles.

Molded thermoplastic and thermoset articles, such as those made from polyolefins, polycarbonates, polyesters, polystyrenes and polyurethanes, are utilized in numerous applications including those for automotive, marine, recreation, construction, office products, and outdoor equipment industries. Often, application of a surface coating to a molded thermoplastic or thermoset article is desirable. For example, molded articles may be used as one part in multi-part assemblies; to match the finish of the other parts in such assemblies, the molded articles may require application of a surface coating that has the same finish properties as the other parts. Coatings may also be used to improve surface properties of the molded article such as uniformity of appearance, gloss, scratch resistance, chemical resistance, weatherability, and the like. Also, surface coatings may be used to facilitate adhesion between the molded article and a separate finish coat to be later applied thereto.

Numerous techniques to apply surface coatings to molded plastic articles have been developed. Many of these involve applying a surface coating to plastic articles after they are removed from their molds. These techniques are often multi-step processes involving surface preparation followed by spray-coating the prepared surface with paint or other finishes. In contrast, IMC provides a means of applying a surface coating to a molded article prior to its ejection from the mold.

Molds used with thermoplastics usually are of a "clam shell" design having mated halves that meet at a parting line. One of the mated halves typically remains stationary whereas the other half typically moves between a closed position and an open, retracted position. To form a molded article, the movable half is moved to its closed position and held closed under a clamping force thereby forming a contained molding cavity. Molten material is injected into the molding cavity. The molded article is formed by thoroughly filling the cavity with the molten material and allowing the material to sufficiently cool and solidify. During the entire molding process, the movable mold half is maintained in its closed position. After molding, the mold halves can be opened and a finished, molded article ejected therefrom.

Owing to differences in mold design and molding conditions, processes where the mold is cracked or parted prior to injection of a coating composition generally are not used for the IMC of injection molded thermoplastics. When molding thermoplastics, it is generally necessary to maintain pressure on the movable mold half to keep the cavity closed and prevent material from escaping along the parting line. Further, maintaining pressure on the thermoplastic material during molding, which also requires keeping the cavity closed, often is necessary to assist in providing a more uniform crystalline or molecular structure in the molded article. Without such packing (i.e., pressure maintenance), physical properties of the molded thermoplastic article tend to be impaired.

Because injection molding does not permit the mold to be parted or cracked prior to injection of the IMC composition into the mold cavity, the IMC composition must be injected under sufficient pressure to compress the article in all areas that are to be coated. The compressibility of the molded article dictates how and where the IMC composition covers it. The process of IMC an injection molded article with a liquid IMC composition is described in, for example, U.S. Pat. No. 6,617,033 and U.S. Patent Publication Nos. 2002/0039656 A1 and 2003/0082344 A1.

A method and apparatus used to physically inject liquid IMC composition into the molding cavity of an injection molding machine during the molding process, also referred to herein as a dispense-and-control method and apparatus, is described in commonly owned, copending International Application No. PCT/US03/33186 (WO 2004/041503) the teachings of which relating to that method and apparatus are incorporated herein by reference. The dispense and control apparatus provides a delivery system for injecting an IMC composition into the cavity of a pair of mold halves on an injection molding machine and a means for controlling the delivery system.

As the IMC composition is injected into the mold cavity and onto the molded article, the flow of the IMC composition can be controlled such that only desired surfaces or portions of surfaces of the article are coated and that those surfaces are optimally coated. Further, the flow of the IIMC composition can be controlled so as to limit it from escaping through the parting line or entering the area near the resin injection orifice.

For example, one method for selectively controlling flow of IMC composition flow is described in US 2003/0082344 A expressly incorporated herein by reference, which teaches methods for controlling the flow and thickness of an IMC composition as it is injected into a mold cavity and onto a molded article. Generally, by controlling the thickness or depth of various areas or sections of the molded article, desired areas of the article can be preferentially coated. Specifically, when a molded article is provided with an area of increased relative thickness at or near the location of the IMC composition injection, flow of the IMC composition is promoted. When the molded article is provided with a runner section or preferred flow channel, IMC composition flow over the surface of the molded article is promoted. Additionally, when the molded article is provided with a containment flange, the flange acts as a barrier and prevents the IMC composition from leaking or seeping off a desired surface and/or out of the mold cavity.

Another method for selectively controlling in-mold coating flow is described in US 2003/0077426 A, expressly incorporated herein by reference, which teaches the use of "flow zones" near the IMC composition injection inlet area to promote the flow of IMC composition from the injection inlet area. Still another method for selectively controlling IMC composition flow is described in US 2003/0099809 A, expressly incorporated herein by reference, which discloses a containment flange functioning like the containment flange described in the US 2003/0077426 A publication but with the added feature of being configured to be removable from the coated thermoplastic article. The removable flange is able to be easily removed. Still yet another method for selectively controlling in-mold coating flow is described in US 2003/0077425 A publication, expressly incorporated herein by reference, which discloses the use of a mold structure formed as part of the molded article that provides a barrier preventing IMC composition flow into the resin injector orifice, gate pin assembly, or the like.

In some injection molding applications, multiple articles may be simultaneously injection molded on a single injection molding machine. More particularly, a single injection molding machine can include a set of mold halves that define more than one part cavity. When the mold halves define multiple part cavities, multiple articles can be molded therein, typically one article per part cavity. In these types of applications, it may be desirable to in-mold coat the multiple molded articles for the reasons discussed above. Accordingly, there is a need for an injection molding and IMC arrangement that allows articles molded in multiple part cavities of a set of mold halves to be in-mold coated. It may be further desirable to coat the multiple molded articles using a single IMC composition injector. Whether coating with a single IMC composition injector or with multiple injectors, there is also a need for controlling the flow of the injected IMC composition on the multiple injection molded articles such that they are coated only on desired surfaces or portions of surfaces.

SUMMARY OF THE INVENTION

In one aspect, the present invention provides a molding apparatus that includes a mold defining a plurality of mold cavities, at least one first composition injector fluidly connected to the plurality of mold cavities for injection molding articles therein, and at least one second composition injector fluidly connected to the plurality of mold cavities for in-mold coating molded articles in the plurality of mold cavities.

In another aspect, the present invention provides a molding apparatus that includes a mold defining a plurality of mold cavities, a means for injection molding articles in the plurality of mold cavities, and a means for in-mold coating the molded articles in the plurality of mold cavities.

BRIEF DESCRIPTION OF THE DRAWINGS

The drawings are only for purposes of illustrating preferred embodiments and are not to be construed as limiting the invention.

DETAILED DESCRIPTION OF ILLUSTRATIVE EMBODIMENTS

Figure 1:
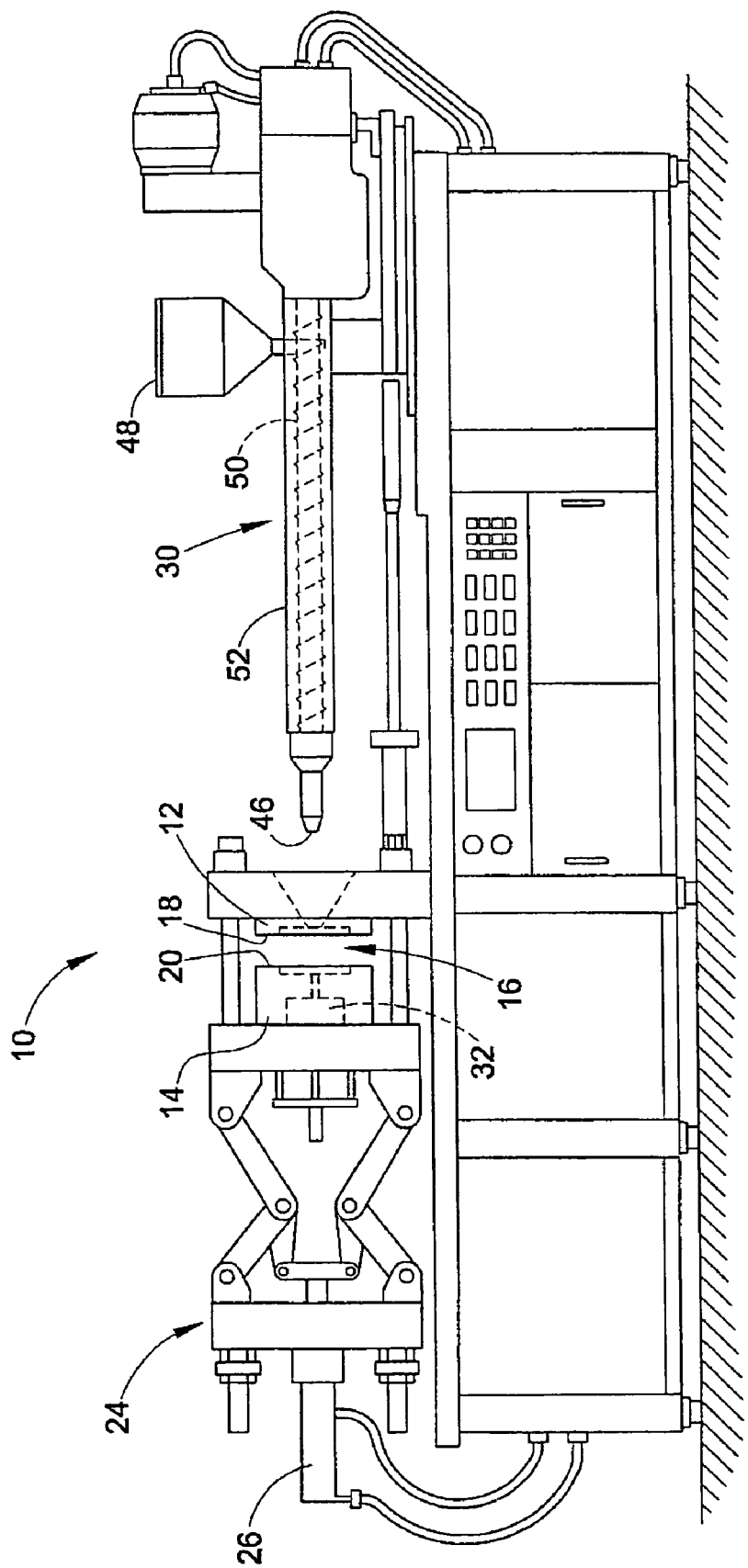
FIG. 1 is a side view of one embodiment of a molding apparatus having a plurality of molding part cavities.

Referring now to the drawings wherein the showings are for purposes of illustrating one or more preferred embodiments of the invention only and not for purposes of limiting the same, FIG. 1 shows a molding apparatus or injection molding machine 10 including a first mold half 12 and a second mold half 14. First mold half 12 preferably remains in a stationary or fixed position relative to second movable mold half 14. In FIG. 1, movable mold half 14 is shown in an open position, although it is movable to a closed position wherein first and second mold halves 12, 14 mate with one another to form a plurality of contained mold cavities 16 therebetween. More specifically, mold halves 12, 14 mate along surfaces 18 and 20 when movable mold half 14 is in its closed position forming a parting line 22 (FIG. 2) therebetween and around part cavities 16.

Movable mold half 14 reciprocates along a generally horizontal axis relative to mold half 12 by action of clamping mechanism 24 with clamp actuator 26 such as through a hydraulic, pneumatic or mechanical actuator as known in the art. Preferably, the clamping pressure exerted by clamping mechanism 24 is capable of generating an operating pressure in excess of the pressures generated or exerted by either one of first composition injector 30 and second composition injector 32. For example, pressure exerted by clamping mechanism 24 can range from 14 MPa (about 2,000 psi) to 105 MPa (about 15,000 psi), preferably from 25 MPa (about 4,000 psi) to 85 MPa (about 12,000 psi), and more preferably from 40 MPa (about 6,000 psi) to 70 MPa (about 10,000 psi) of the mold surface.

Figure 2:
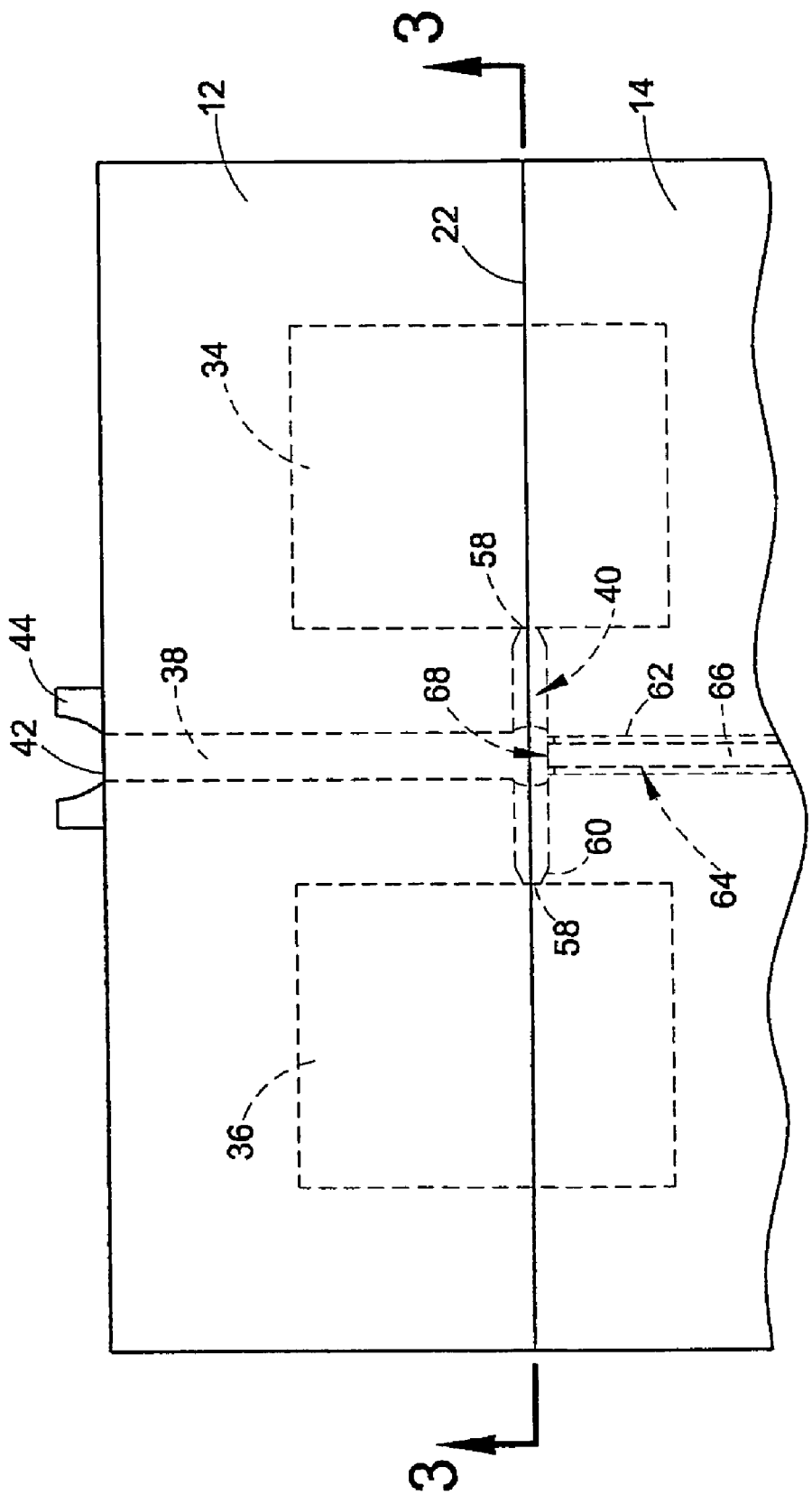
FIG. 2 is a schematic plan view of a mold including a movable mold half in a closed position and a stationary mold half showing (in hidden lines) the plurality of part cavities, a runner section, a sprue section and a second injector passageway.

With additional reference to FIG. 2, mold halves 12, 14 are shown in a closed position abutting or mating with one another along parting line 22 to form plurality of part cavities 16 including a first part cavity 34 and a second part cavity 36. Each of part cavities 34, 36 has a finite and/or substantially fixed volume. The design of each of the part cavities 34, 36 can vary greatly in size and shape according to the desired end product or article to be molded in each of part cavities 34, 36. Additionally, the number of part cavities defined by mold halves 12, 14 can vary. In the illustrated embodiment, first mold half 12 includes a sprue passageway 38 and a runner section 40 for fluidly communicating between an inlet 42 defined by or adjacent a locating ring 44 located at the rear of mold half 12 and part cavities 34,36. Locating ring 44 includes a female radius surface for mating with first composition injector 30, as described in more detail below.

First composition injector 30 is that which is typical in an injection molding apparatus and is generally capable of injecting a thermoplastic or thermosetting composition, generally a resin or polymer, into part cavities 34, 36 by forcing the composition through sprue passageway 38 and runner section 40. First injector 30 is positioned to inject material from fixed half 12, and the second composition injector 32 is positioned to inject an IMC composition from movable mold half 14. Obviously, mold halves 12, 14 could be modified such that first composition injector 30 is reversed and placed in or adjacent moveable mold half 14.

In FIG. 1, first composition injector 30 is shown in a "backed off" position but can be moved horizontally so that a nozzle or resin outlet 46 of first injector 30 mates with mold half 12. In the mated position, injector 30 is capable of injecting its contents into mold cavities 34,36 through sprue passageway 38 and runner section 40. For purposes of illustration only, first composition injector 30 is shown as a reciprocating-screw machine wherein a first composition can be placed in a hopper 48 and a rotating screw 50 then can move the composition through a heated extruder barrel 52, where the first composition or material is heated above its melting point. As the heated material collects near the end of barrel 52, screw 50 acts as an injection ram and forces material through nozzle 46 and into first mold half 12. Nozzle 46 optionally has a valve (not shown) at the open end thereof and screw 50 generally has a non-return valve (not shown) to prevent backflow of material thereinto.

First composition injector 30 is not limited to the embodiment shown in FIG. 1 but can be any apparatus capable of injecting a flowable (e.g., thermo-plastic or thermosetting) composition into mold cavities 34,36. For example, the injection molding machine can have a mold half movable in a vertical direction, such as in a stack mold with center injection. Other suitable injection molding machines include many of those available from Cincinnati-Milacron, Inc. (Cincinnati, Ohio), Battenfeld Injection Molding Technology (Meinlerzhagen, Germany), Engel Machinery Inc. (York, Pa.), Husky Injection Molding Systems Ltd. (Bolton, Canada), BOY Machines Inc. (Exton, Pa.) and others.

Figure 3:
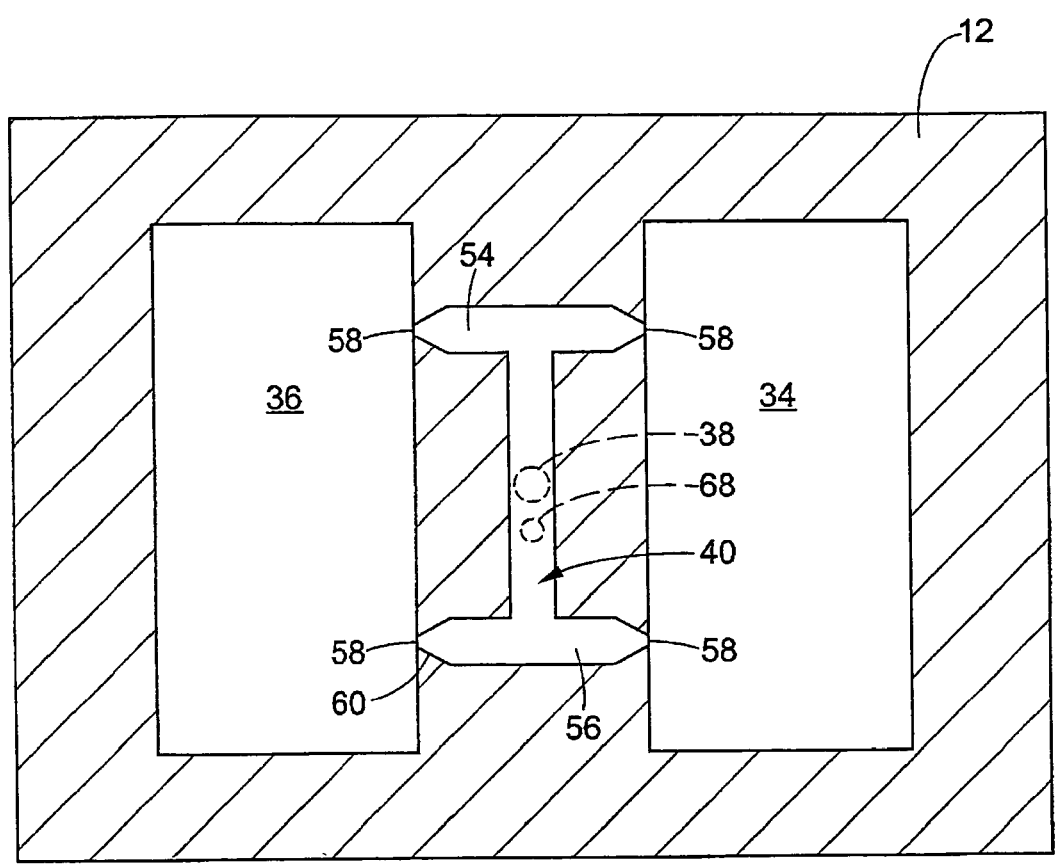
FIG. 3 is a schematic cross-sectional view taken along the line 3-3 of FIG. 2 showing the runner section fluidly connected to the part cavities.

With reference to FIGS. 2 and 3, runner section 40 includes an upper T-shaped portion 54 and a lower T-shaped portion 56 for delivering the first composition injected through sprue 38 into part cavities 34,36. Runner section 40 is defined across parting line 22 by both of mold halves 12,14. Inlet orifices 58 are formed where runner section 40 intersects part cavities 34,36. Adjacent to each inlet orifice 58, runner section 40 includes a tapered portion 60 that allows for relatively easy removal of the first (resinous) composition formed in runner section 40 from the articles or parts formed in part cavities 34,36.

Second composition injector 32 generally is capable of injecting an IMC composition into mold cavities 34,36 to coat molded articles formed therein. Second injector 32 is shown positioned in movable mold half 14 although halves 12,14 can be modified such that second injector 32 alternatively is placed in or adjacent stationary mold half 12. For injection of the second composition into cavities 34,36 by second injector 32, a second injector passageway 62 extends through second mold half 14 to runner section 40. Second injector passageway 62 allows a nozzle 64 of second injector 32 to extend into mold half 14 and fluidly communicate with runner section 40. Nozzle 64 includes a pin or valve 66 that is movable between an open position wherein fluid communication is permitted between second injector 32 and runner section 40, and a closed position wherein fluid communication is prevented between second injector 32 and runner section 40. Valve 66 is normally biased or urged toward the closed position (as shown), but is selectively movable toward the open position by second injector 32.

Figure 5:
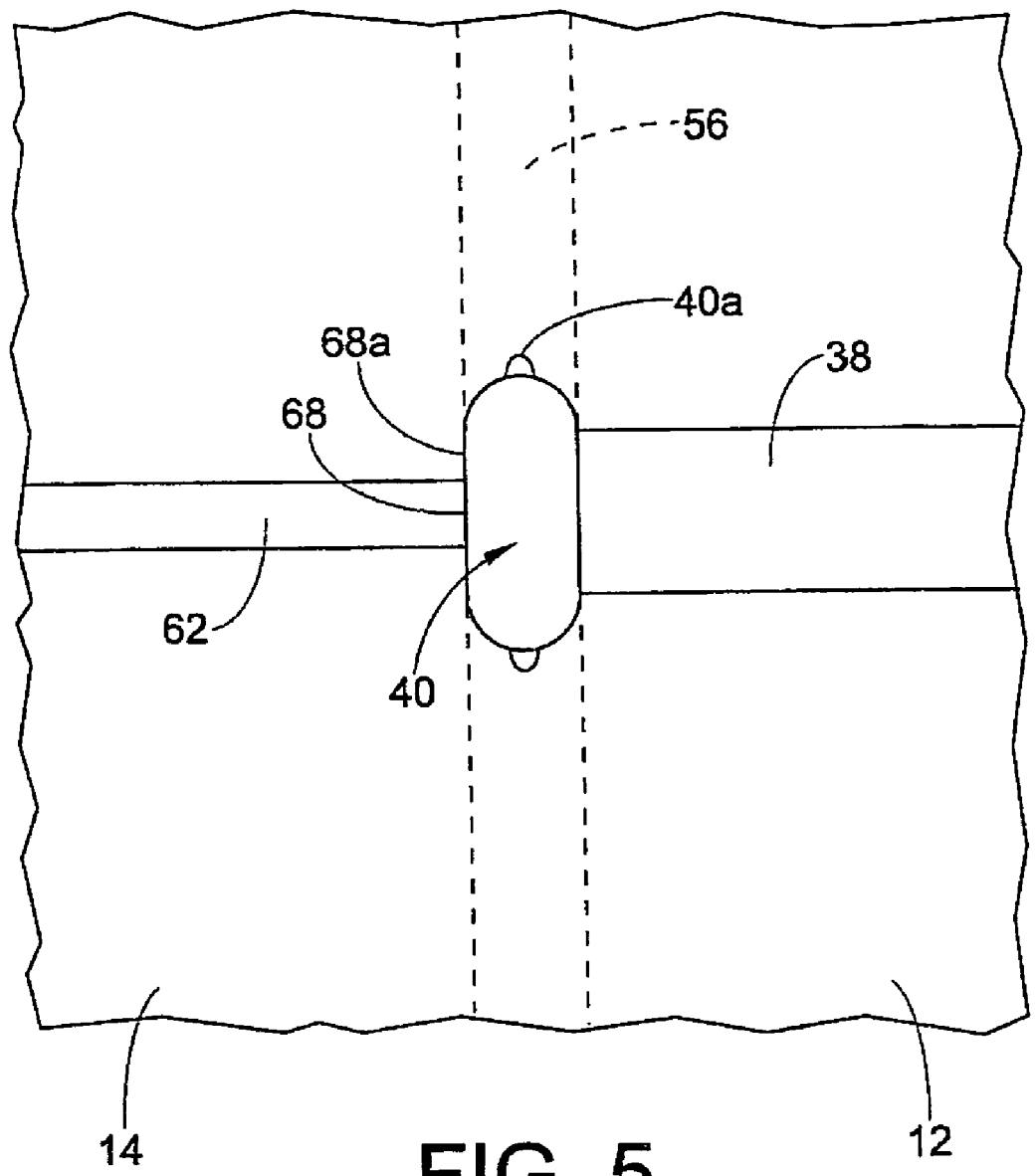
FIG. 5 is an enlarged partial schematic plan view of the mold halves of FIG. 2.

With additional reference to FIG. 5, in second injector passageway 62 intersects with runner section 40 at location 68 (illustrated in phantom lines in FIG. 3). Preferably, the portion 68a of runner section 40 adjacent location 68 is shaped to form a flat runner section of the first (resinous) composition. Forming a flat runner section is intended to promote better flow distribution of the IMC composition introduced through second injector 32 onto the runner formed in runner section 40. Further, the cross-section of passageway 62 preferably is smaller than the cross-section of the portion of runner section 40 adjacent location 68. This size relationship and the flatness of runner section 40 better urges or directs the injected IMC along the formed runner toward part cavities 34,36 and away from parting line 22.

Figure 4:
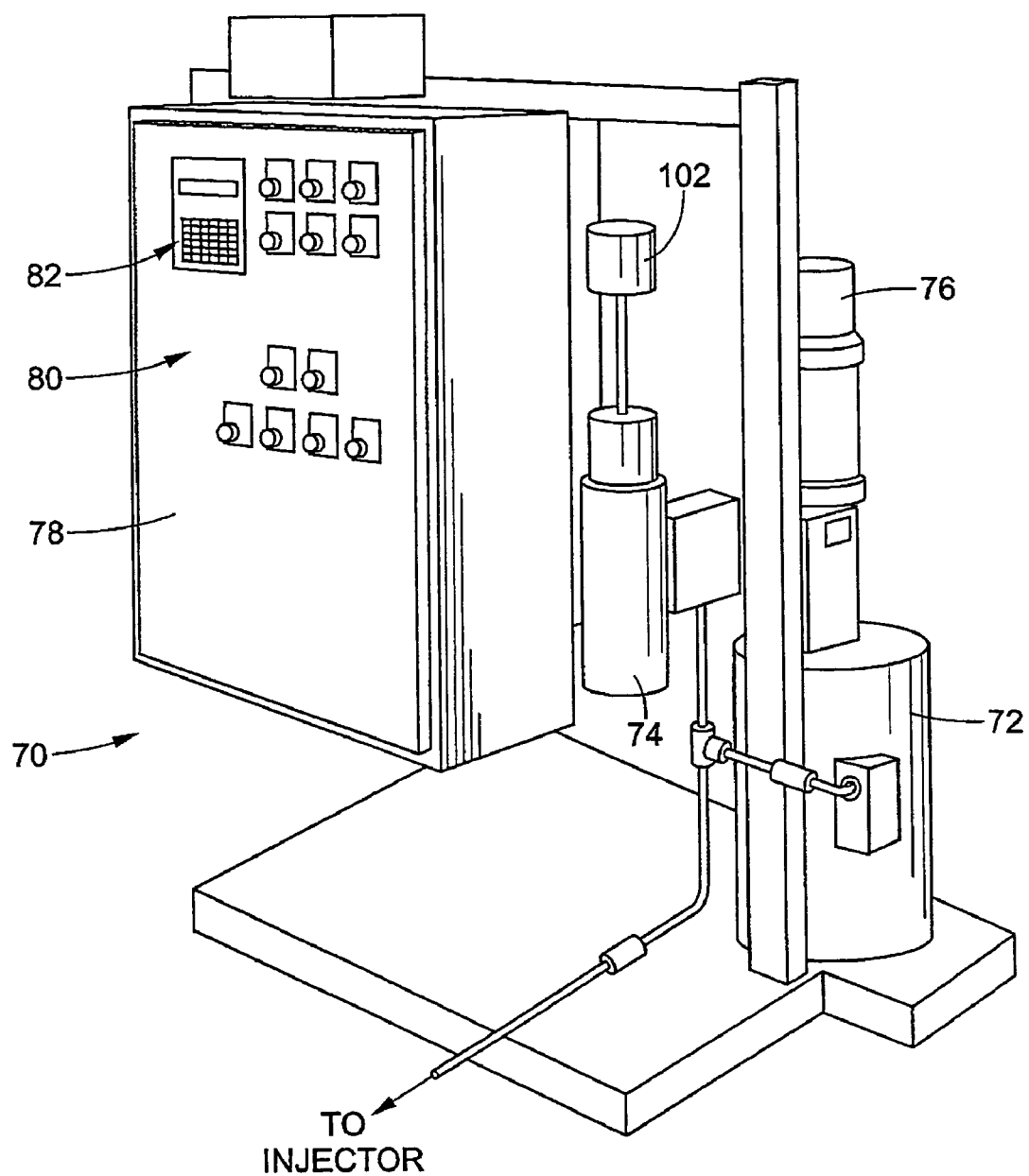
FIG. 4 is a perspective view of an IMC dispense and control apparatus adapted to be connected to the molding apparatus of FIG. 1.

Referring to FIG. 4, an IMC dispense and control apparatus 70 is capable of being connected to molding apparatus 10 and, specifically, second injector 32 for providing IMC capabilities and controls. Control apparatus 70 is described in the above-referenced international application no. PCT/US03/33186.

Generally, control apparatus 70 includes a receiving cylinder 72 for holding a container filled with an IMC composition. A suitable IMC composition is described in, for example, U.S. Pat. No. 5,777,053. Control apparatus 70 further includes a metering cylinder or tube 74 and an air-driven transfer pump 76. Metering cylinder 74 is selectively and fluidly connectable to the coating container in receiving cylinder 72. More specifically, a fluid line connects the coating container to metering cylinder 74. A valve is provided on the fluid line for controlling communication therethrough. Transfer pump 76 is adapted to selectively pump IMC composition of the coating container to metering cylinder 74 when the fluid line valve is in an open position.

Using conventional fluid communication lines, metering cylinder 74 is fluidly connectable to second injector 32 of molding apparatus 10. A hydraulic means such as a hydraulically driven piston 102 is provided for selectively evacuating IMC composition held in metering cylinder 74 therefrom, as is described in more detail below. The evacuated in-mold coating composition is directed by and through fluid communication lines to second injector 32. Control apparatus 70 includes appropriate connections (not shown) for connecting it to a conventional electric power source and a conventional compressed air source. Specifically, control apparatus 70 includes an electric box 78 capable of being connected to a conventional 460 volt AC or DC power outlet. Electric box 78 includes a plurality of controls 80 and a touch pad controller 82 thereon for controlling the dispensing of the IMC composition from apparatus 70 to second injector 32 and for controlling second injector valve 66. The electric power source provides power for the electronics, electronic controls and the hydraulic pump of apparatus 70. The compressed air source provides power for air-driven transfer pump 76.

To make a coated article, with reference to FIG. 1, a thermoplastic first composition is placed in hopper 48 of the molding apparatus 10. Any suitable thermoplastic first composition that can be injection molded is suitable for use with or in the present invention. Examples of thermoplastic materials include, but are not limited to, polyethylene terephthalate (PET), nylon, acrylonitrile-butadiene-styrene (ABS), polystyrene, polycarbonate, acrylic, acetal, polyolefins such as polyethylene and polyethylene, polypropylene, and polyvinyl chloride (PVC). The foregoing list is not meant to be exhaustive but only illustrative of various useful thermoplastic materials.

Prior to injecting the first composition mold halves 12,14 are closed by clamp mechanism 24 to create contained molding part cavities 34,36. In the closed position, clamping mechanism 24 maintains a clamping pressure sufficient to maintain mold halves 12,14 in closed relation even when the first and second compositions are injected under pressure into part cavities 34,36. Also prior to injecting first composition, first injector 30 is moved into nesting or mating relation with first mold half 12.

Through conventional means, e.g., using heated extruder barrel 52 and rotating screw 50, first injector 30 heats the first composition above its melting point and directs it toward nozzle 46 of first injector 30. If nozzle 46 is equipped with a nozzle valve, it is moved to an open position for a predetermined amount of time to allow a corresponding quantity of the first composition to pass through the sprue passageway and runner section to fill part cavities 34,36. Screw 50 provides an injection pressure or force that urges the first composition into part cavities 34,36 until the nozzle valve is returned to its closed position. In other words, part cavities 34,36 are filled and packed by the first composition. Once part cavities 34,36 are filled and packed, the molded first composition is allowed to cool thereby forming molded articles in part cavities 34,36. A portion of the first composition will remain in sprue passageway 38 and runner section 40 forming therein, respectively, a sprue and a runner.

After specified surfaces of the molded articles in part cavities 34,36 have cooled below their melt points or otherwise reached a temperature or modulus sufficient to accept or support a coating, the IMC composition can be injected into part cavities 34,36 and onto the molded articles. If the IMC composition is cured by heat, it desirably is injected before the surfaces of the molded articles have cooled so much such that curing would be inhibited. To inject the IMC composition, valve 66 is moved to an open position and the hydraulic means is actuated to evacuate a predetermined amount of the IMC composition from metering cylinder 74, through second injector 32, and into part cavities 34,36. More specifically, from second injector 32, the IMC composition is directed through nozzle 64 and onto the flat portion of the runner adjacent location 68. As described in more detail below, the IMC composition is directed along runner section 40 and into part cavities 34,36 to coat desired surfaces of the molded articles. The flat portion promotes the flow of the IMC composition into cavities 34,36.

The mold need not be opened or unclamped before the IMC composition is applied. That is, mold halves 12,14 can maintain parting line 22 and generally remain substantially fixed relative to each other while both the first and second compositions are injected into mold cavities 34,36. Thus, the substantially fixed volume of each of mold cavities 34,36 can be constant and maintained throughout the molding and coating steps. The IMC composition spreads and coats a predetermined portion or area of the molded articles. Immediately or very shortly after the IMC composition is fully injected into mold cavities 34,36, apparatus 70 allows valve 66 of second injector 32 to return to its closed position, thereby preventing further injection of IMC composition into mold cavities 34,36.

After the predetermined amount of IMC composition is injected into mold cavities 34,36 and covers or coats the predetermined areas of the molded articles, the coated articles can be removed. Before mold halves 12,14 are parted, the IMC composition is cured. The cure is optionally heat activated, from sources including the articles themselves or the mold halves 12,14 which are at or above the curing temperature of the IMC composition. Cure temperature can vary depending on the IMC composition utilized. If curing of the IMC composition is heat activated, the IMC composition preferably is injected before the molded article(s) have cooled to a point below where curing of the coating can be achieved easily or economically. These types of IMC compositions require a minimum temperature to activate the catalyst and/or initiator present therein to cause a cross-linking reaction to occur, thereby curing and bonding the coatings to the molded articles.

Controlling flow of the IMC composition as it passes from injector 32 to cavities 34,36 and onto the articles can be done by controlling the thickness of one or more portions of the articles as well as by controlling the thickness and profile design of runner section 40 leading to part cavities 34,36. For example, referring to FIG. 5, runner section 40 can be shaped to form a containment flange 40*a* on the runner to limit and thereby control flow of the IMC composition. The containment flange functions like those discussed in the first two of the selective flow control publications discussed above. Specifically, the containment flange contains the IMC composition as it flows between the walls defining runner section 40 and the runner formed therein due to its thin cross-section and relative lack of compressibility. Once the controlled flow of the IMC composition reaches cavities 34,36, the shape of the molded cavities therein can further control the flow of the IMC composition in cavities 34,36 and on the molded articles such that only desired surfaces or portions of surfaces are coated. In the illustrated embodiment, the containment flange on the runner could be formed along parting line 22 and the surfaces to be coated on each of the articles formed in part cavities 34,36 could be adjacent second mold half 14. Thus, the IMC composition can be contained and only allowed to flow on the second mold half side of parting line 22.

Although the present invention has been illustrated and described as having two mold halves defining a pair of cavities that receive an IMC composition from a single injector, other arrangements are contemplated and within the scope of the present invention. For example, the mold halves may define one or more than two part cavities. Another arrangement would employ separate IMC composition injectors and/or control and dispense apparatuses for each cavity defined in the mold halves. Yet another arrangement would employ a single injector adapted to provide IMC to part cavities located in different sets of mold halves.

Further alternative arrangements are contemplated. In one such embodiment, injector 32 can be mounted on first mold half 12 and coat a side of the runner formed in runner section 40 adjacent first mold half 12. Alternatively, with second injector 32 mounted on first mold half 12, IMC composition can be directed through mold half 12 to the sprue formed in sprue passageway 38. Various arrangements of containment flanges can be formed along sprue passageway 38 and runner section 40 to direct the IMC composition injected to part cavities 34,36. In another such embodiment, second injector 32 can be oriented to directly inject IMC compositions onto a desired surface of one of the articles formed in part cavities 34,36. The IMC composition then can be directed to coat that article and flow along runner formed in the runner section 40 to coat the article formed in the other of part cavities 34,36. In still yet another alternative embodiment, second injector 32 can be used to deliver IMC composition directly to a plurality of locations on any combination of the article formed in first cavity 34, the article formed in second cavity 36, the sprue and/or the runner. Second injector 32 would deliver the IMC composition to the plurality of locations by using passages that branch off one another.

That which is claimed is:

1. A molding apparatus, comprising:
   mold members defining a plurality of fixed mold cavities therebetween;
   an injection molding injector fluidly connected to each of said plurality of mold cavities for injection molding molded articles therein;
   an in-mold coating injector having a single nozzle fluidly connected to each of said plurality of mold cavities for in-mold coating said molded articles in said plurality of mold cavities, said plurality of mold cavities fluidly connected to said injection molding injector being the same as those fluidly connected to said in-mold coating injector, said mold members and said injectors configured to injection mold and in-mold coat molded articles in said mold cavities while said mold members remain a fixed distance apart relative to one another during and between injection molding and in-mold coating;
   a runner section; and
   an in-mold coating injector passageway fluidly connected to said in-mold coating injector and said runner section, said in-mold coating injector passageway having a smaller cross-sectional area than said runner section adjacent an intersection between said in-mold coating injector passageway and said runner section, wherein said runner section is generally cylindrical with a portion of said runner section adjacent said intersection being relatively flat shape.

2. The molding apparatus of claim 1, further including:

a sprue passageway fluidly connected to said injection molding injector, wherein said runner section is fluidly connected to said sprue passageway and said plurality of mold cavities.

3. The molding apparatus of claim 2 wherein said runner section includes a plurality of portions fluidly connected to each of said plurality of mold cavities at a plurality of inlet orifices.

4. The molding apparatus of claim 3 wherein said runner section includes a tapered portion adjacent each of said plurality of inlet orifices for allowing relatively easy removal of thermoplastic material formed in said runner section from said molded articles formed in said plurality of mold cavities.

5. The molding apparatus of claim 1 wherein each of said plurality of mold cavities has a fixed volume that remains fixed when said injection molding injector injection molds said molded articles and when said in-mold coating injector in-mold coats said molded articles.

6. The molding apparatus of claim 2 wherein said runner section includes a containment flange recess in which a molded containment flange is formed that directs in-mold coating injected from said in-mold coating injector toward said plurality of mold cavities.

7. The molding apparatus of claim 1 wherein said plurality of mold cavities is fluidly connected to only a single injection molding injector and is fluidly connected to only a single in-mold coating injector.

* * * * *